Dec. 16, 1969     D. S. EVANS     3,484,781

REFLECTED HALF-BASE DIGITIZER

Filed June 9, 1966     3 Sheets-Sheet 1

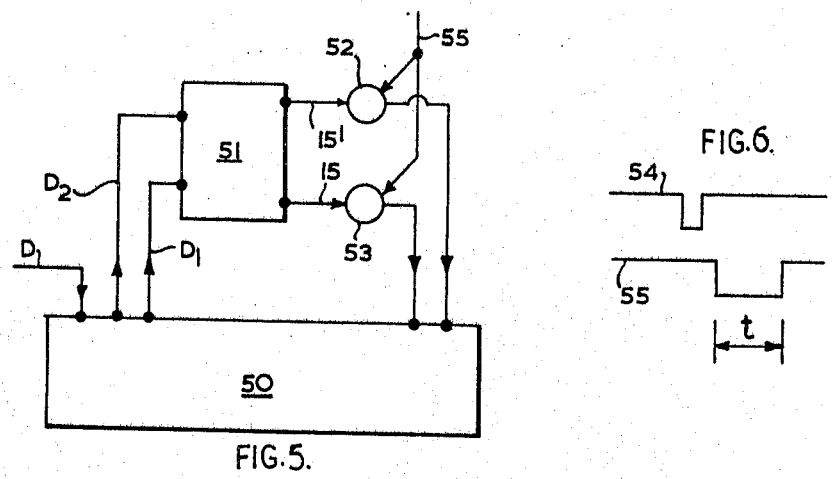
FIG. 5.
FIG. 6.
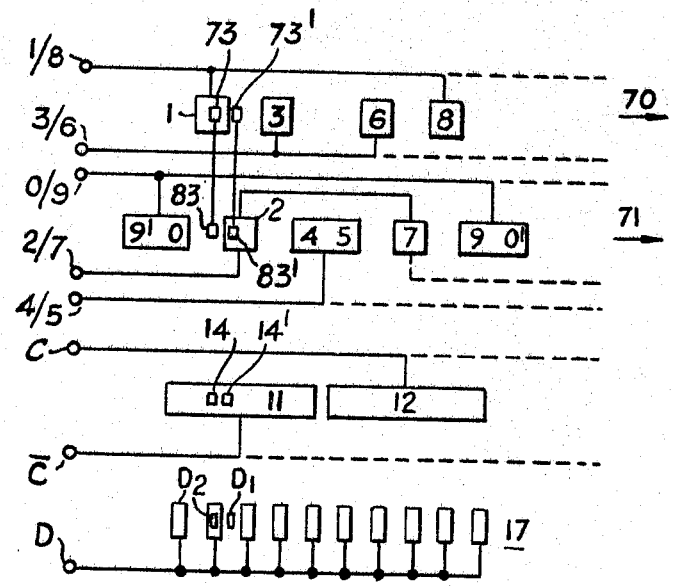
FIG. 7.

3,484,781
REFLECTED HALF-BASE DIGITIZER
David Silvester Evans, Kent, England, assignor to Morre
Reed (Industrial) Limited, Walworth, Andover, Hampshire, England, a corporation of the United Kingdom
Filed June 9, 1966, Ser. No. 556,403
Claims priority, application Great Britain, June 22, 1965, 26,346/65
Int. Cl. H03k 13/00
U.S. Cl. 340—347                    11 Claims

ABSTRACT OF THE DISCLOSURE

A contact type digitizer having at least a first set of electrical contacts sequentially disposed to correspond to a scale of notation wherein the number of contacts is equal to the base of the scale and wherein the contacts are electrically connected together in complementary pairs symmetrically disposed about the center of the scale, except in the case of an odd based scale when the center contact has no complement and is electrically separated, wherein the complementary contacts are grouped together into lower and upper groups complementary to one another and wherein each of the pairs of contacts are electrically separated from the others of said pairs and wherein the digitizer further includes at least a second set of not more than two contacts disposed to provide a second contact path wherein one contact corresponds to one group of complementary contacts and the other contact, if present, to the other group.

---

This invention relates to contact type digitizers, wherein the code of each scale is reflected at the centre of the scale and complements on the base.

Examples of well-known scales of notation are the binary, decimal and duodecimal but many others have been or can be used. The base of a scale of notation is the number of distinct digits which are required to express all the readings of the scale; thus, a binary scale requires two digits (0 and 1), a decimal scale requires ten digits (0, 1 . . . 9) and a duodecimal scale requires twelve digits. In explaining this invention, reference will be made to a decimal scale but it is to be understood that the principles may be applied to scales having other bases.

The term "reflected half-base" will be used to describe apparatus in which signals related to the digits of the lower half of the base are the same as those related to the corresponding complementary digits in the upper half of the base.

According to this invention a reflected half-base digitizer comprises: a first electrical contact set, the contacts being sequentially mounted and disposed along a first contact track path, the contacts corresponding to a scale of notation and being equal in number to the base of the scale; all the contacts, if the base is even, or all except the centre contact, if the base is odd, being connected together in complementary pairs symmetrically disposed about the centre of the scale, whereby the complementary contacts are grouped together into lower and upper groups complementary to one another; a second contact set having one or two contacts mounted and disposed along a second contact track path parallel to and in fixed relationship with the first contact track path one contact corresponding to one group of complementary contacts and the other contact, if present, to the other group: a first pair of brushes mounted in longitudinally movable relationship with the first contact set, capable of making contact therewith and having a leading brush mounted in advance of a lagging brush along the corresponding track, the brushes being so spaced that the lagging brush ceases to connect with a contact, only if the leading brush is connected with the next adjacent contact: a second pair of leading and lagging brushes, capable of acting in a similar manner to the first pair of brushes and mounted in movable relationship with the second contact set, to provide a signal indicating to which group of complementary contacts at least one of the first pair of brushes is connected: all the brushes being mounted in fixed relationship, one to another.

The contacts of a contact set may be mounted in line along the corresponding track. Alternatively, they may be staggered, perpendicular to the length of the track, so as to be disposed along two or more parallel lines of contacts, each line being parallel to the length of the track. In this alternative arrangement, the pair of brushes of the linear arrangement is replaced by a pair of brush sets, there being provided a leading brush and a lagging brush associated with each line of contacts, all the leading brushes being electrically directly connected together and mounted on a single line perpendicular to the length of the track, and all the lagging brushes being similarly connected and mounted.

The staggered arrangement of the contacts of a set allows the length of each contact to be substantially equal to the track length corresponding to a digit of the scale, without adjacent contacts shorting together.

A digitizer may also include means for providing a drive signal for driving choosing means for selecting a desired one of each pair of brushes, according to the true reading of the scale as determined by the relative positions of the scale and the first pair of brushes.

The means for providing a drive signal may be a third contact set having as many contacts as the first contact set, disposed in fixed relationship with the first and second sets along a contact track path parallel to the first and second track paths, each contact extending over a path length corresponding to half the track length occupied by a contact of the first contact set, the contacts being uniformly spaced so that a contact and an adjacent space correspond to one contact of the first contact set. All the contacts of the third contact set are connected directly together and two brushes are arranged in leading and lagging relationship and mounted, in fixed relationship with the brushes relating to the first and second contact sets, to connect alternately with each contact of the third set; the two brushes are then capable of providing drive signals for choosing means, when the said means is an independent unit. The choosing means if independent, may comprise a bistable trigger circuit; or the choosing means may comprise the second contact set of a second immediately preceding finer digitizer, having the same base, to which the digitizer is mechanically coupled.

Such a third set of contacts may be staggered, as hereinbefore described, if desired.

Some at least of the contacts must be insulated from others and it is usually convenient to mount or form the contacts, in any convenient known manner, on a suitable insulator which also forms a supporting member.

It is usually preferable to maintain the contacts and their supporting member in a fixed position and to provide means for moving the brushes, as desired, to vary the scale setting. In this way, only a small number of movable connections, e.g. slip rings, are required.

The track paths may be linear, circular, or they may have any other desired convenient form; when the path is, for example, circular the tracks may be open or closed. A track may comprise a single scale, of length corresponding to the base, or it may comprise a plurality of scales, each of base length, joined one to another and disposed sequentially along the track, the brushes being movable along the whole length of the track. A plurality of digitizers, each having a single or multiple scale and corresponding brushes, may be mechanically connected together by gears or other means.

The nature of the invention will now be explained by describing a first exemplary embodiment of a decimal digitizer, referring to the drawings accompanying the provisional specification in which:

FIGURE 5 is a diagram showing inhibition gates applied to the outputs of the choosing means of a digitizer; and, FIGURE 6 illustrates one suitable set of drive and read signals, for application to the arrangement of FIGURE 5.

Figure 1:
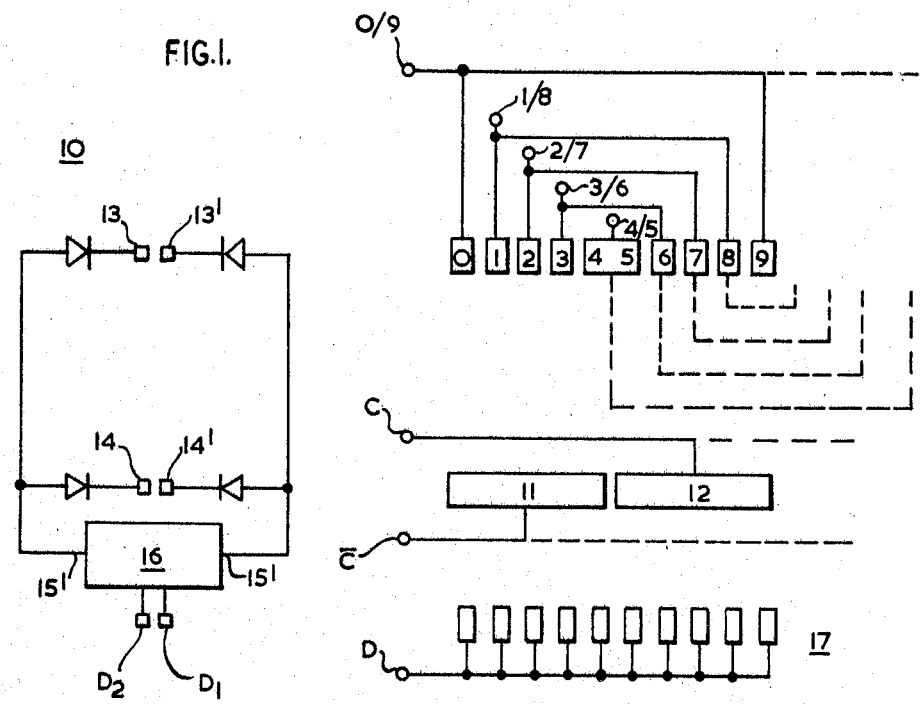
FIGURE 1 is a diagram showing contacts and their connections, for a single decade scale, together with associated brushes and including brush choosing means.

A second exemplary embodiment will be described, referring to the accompanying drawing, in which:

FIGURE 7 is a diagram similar to that of FIGURE 1 but showing the contacts of the first contact set staggered to form two parallel lines of contacts, the staggered first contact set being provided with a pair of brush sets, each comprising two brushes.

In FIGURE 1 the reference numerals 0 to 9 indicate a first contact set, the contacts corresponding respectively to the digits 0 to 9 of a single decade of a decimal scale. These contacts are connected together in complementary pairs, symmetrically disposed about the centre of the scale; since the base of the scale is even, the centre lies between contacts 4 and 5, which contacts may therefore be combined into a single contact of effectively double length as shown; contacts 0 and 9 can be similarly combined with contacts corresponding to the digits 9 and 0 of a preceding and a succeeding scale, respectively. The pairs of contacts are connected to terminals identified as 0/9, 1/8, 2/7, 3/6 and 4/5, referring to the corresponding contacts. The contacts may be considered as grouped together into a lower group, comprising contacts 0 to 4, and an upper group, complementary to the lower group and comprising contacts 5 to 9.

Contacts 11 and 12 form a second contact set, contact 11 corresponding in length to the lower group of contacts, 0 to 4, of the first contact set; contact 12 similarly corresponds to the upper group of contacts, 5 to 9. The contacts 11 and 12 are connected to terminals $\overline{C}$ and C, respectively.

At 10 there is shown a first pair of brushes, 13 and 13'. These brushes are mounted in movable contact relationship with the contacts 0 to 9 and are separated by a fixed distance only just so great that when, for example, brush 13 is about to move off the contact 1 and towards the contact 2, brush 13' has already moved off the contact 1 and is in electrical connection with the contact 2; thus, in reading the scale forwards, the brush 13' is a leading brush, mounted in front of the lagging brush 13. A second pair of brushes, 14 and 14', are similarly arranged relative to the contacts 11 and 12, brush 14' leading brush 14.

Figure 2:
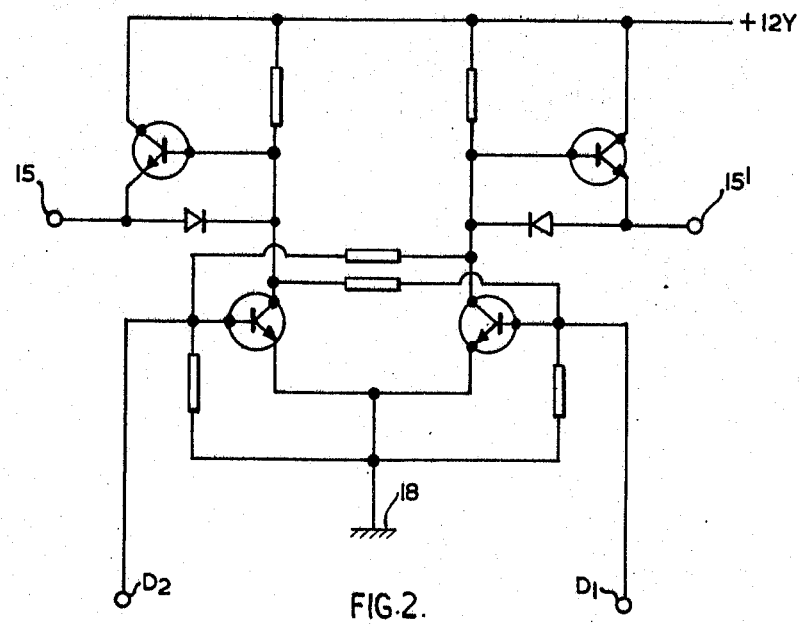
FIGURE 2 is a circuit diagram showing a bistable trigger circuit, suitable for use in choosing means associated with the contacts of FIGURE 1.

The leading brushes 13' and 14' are connected, through diodes, to one output terminal 15' of choosing means 16, and the lagging brushes 13 and 14 are similarly connected to the other output terminal 15 of the choosing means. The choosing means 16 functions as a switch for connecting either the leading or the lagging brushes to a common line (not shown), in response to corresponding drive signals applied at connections $D_1$ and $D_2$. A suitable choosing means comprises a bistable trigger circuit, such as is shown in FIGURE 2, where 18 is the common line.

All the brushes are so mounted, in fixed relationship one to another and in movable relationship with the first and second contact sets that, when the choosing means 16 is suitably driven electrically, one of the terminals 0/9, 1/8, 2/7, 3/6 and 4/5, and one of the terminals C and $\overline{C}$, are connected to the common line, according to the positions of the brushes 13' and 13 relative to the decimal scale defined by the first contact set. There is, of course, ambiguity as to which of a complementary pair of contacts is connected through brush 13' or 13; contacts 11 and 12 are connected to terminals $\overline{C}$ and C, C and $\overline{C}$, are connected to the common line, according the first contact set, that either terminal $\overline{C}$ or C is contact of the first set is in the lower (i.e. 0 to 4) or upper (i.e. 5 to 9) group of contacts. Thus, by interrogating lines connected to terminals 0/9 to 4/5, and also lines connected to terminals $\overline{C}$ and C (a total of seven lines only) it is possible to read the decimal scale.

The drive signals which are to be applied to connection $D_1$ and $D_2$ may be obtained as follows: in FIGURE 1 there is shown a third contact set 17, comprising ten contacts; each contact extends over a path length corresponding to half the track length occupied by a contact of the first contact set, the contacts being so uniformly spaced that a contact and an adjacent space correspond to one contact of the first contact set. All the contacts of the set 17 are connected directly together, and to a terminal D. The connections $D_1$ and $D_2$ comprise a pair of brushes, mounted in fixed relationship with the brush pairs 13, 13' and 14, 14'. Thus, as the brushes are moved relative to the contact sets, the connections $D_1$ and $D_2$ of the choosing means are alternately connected to the terminal D, according as one or the other brush connects with a contact of set 17. The relative dimensions and dispositions of the various contact sets, and the dispositions of the various brushes, are so co-operatively arranged that the choosing means 16 may be driven in the manner explained hereinbefore.

The third contact set 17, by virtue of the ten contacts and ten spaces (including a space at the beginning), provides a scale twice as fine as that provided by the first contact set. The brushes $D_1$ and $D_2$, and terminal D, are thus capable of providing signals corresponding to 0.5, and the complement $\overline{0}.5$, of a single division of the scale corresponding to the first contact set; these connections may, in fact, be so used, if desired.

In the example just described, one of the contacts 11 and 12, and the associated terminals $\overline{C}$ and C, may be omitted, if desired; the presence or absence of connection, at the remaining terminal, then indicates to which group of the first contact set the relevent brush 13' or 13 is connected. When, however, the decimal scale 0 to 9 is one of a plurality of coupled scales (to be described hereinafter), the two contacts are preferably provided, for each scale, to operate as choosing means for the next coarser scale.

If suitable additional electronic circuits are provided, the decimal scale can be read by interrogating only the five lines connected to terminals 0/9 to 4/5; however, it is usually preferable to use seven lines, or six, if only one of contacts 11 and 12 is provided, thereby effecting a saving in associated electronic equipment.

It will be seen that the decimal scale is reflected about its centre, the resulting two halves being distinguished by means of the complementing digits available at terminals $\overline{C}$ and C. Evidently, by reversing the connections to $\overline{C}$ and C, the direction of reading can be reversed.

A scale such as is shown in FIGURE 1 may be read as a centre-zero scale, reading 4/0, 0/4, the contacts 11 and 12 providing means for indicating whether a particular reading lies to the left or right of contact 4, 5 (which will correspond to zero); that is, for example, whether the reading is negative or positive. Alternatively, the scale may be reversed by an external command signal, to produce a symmetrical or asymmetrical positive and negative reading scale. This latter facility is particularly suited to cases where, for example, readings relate to elevation above and depression below horizontal, and are to be presented as corresponding positive and negative values from zero.

The arrangement illustrated in FIGURE 1 may conveniently be used, in co-operation with suitable electronic circuits, in computation; thus, subtraction may be performed by adding cooresponding complements plus one, unknown manner, by suitably selecting terminals $\overline{C}$ and C.

The various contacts are shown, in FIGURE 1, disposed along parallel straight line tracks. They may, of course, be disposed along parallel tracks having desired suitable shape; in particular, the tracks may be concentric circles. The ends of the contact sets may then be closed on one another, so that the brushes follow continuous closed circular tracks; in which case, the contacts 0 and 9 may be combined to form one single contact of double effective length, in a manner similar to contacts 4 and 5, and a rotary shaft may serve as mechanical input means to the digitizer.

The contacts 0 to 9 of the first contact set are shown disposed along a single line in FIGURE 1. An alternative arrangement is shown in FIGURE 7, the contacts 0 to 9 being staggered alternatively along two parallel lines 70 and 71; the contacts 0 and 9 are here shown common with contacts 9′ and 0′ of the preceding and succeeding scales, respectively, as mentioned hereinbefore. Elements which are common to FIGURES 1 and 7 carry the same reference indices.

In FIGURE 7, the pair of brushes 13 and 13′ of FIGURE 1 is replaced by a corresponding pair of brush sets, respectively a set comprising brushes 73 and 83 and a set comprising brushes 73′ and 83′. The brushes 73 and 83 are electrically connected directly together, as are the brushes 73′ and 83′. The brush pairs 14, 14′, and D1, D2 are, in FIGURE 7, shown in positions corresponding to the positions of the brush sets 73, 83 and 73′, 83′.

Each of the contacts disposed in the staggered arrangement of FIGURE 7 can occupy the whole of a space, along the track, corresponding to the relevant digit of the scale, without making electrical connection with a contact corresponding to an adjacent digit.

It will be seen from FIGURES 1 and 7 that interconnections of the various contacts nowhere overlap; it is thus simple to form the contacts, and their interconnections, by conventional printed circuit techniques alone, without soldered or like joints. The dashed lines in FIGURES 1 and 7 indicate how such interconnections may be extended to a following decade, if such an arrangement is desired.

A plurality of digitizers, such as have just been described, may be connected together by means, such as gear trains, so that the relative brush contact speed of a decade digitizer is one tenth that of the immediately preceding decade digitizer. Such an arrangement is particularly convenient, when the contacts are arranged along closed circular tracks, the input being by means of a rotary shaft. The fine digitizer (i.e. the lowest decade) will be operated directly by the input shaft and will comprise a third contact set, 17, to provide drive for the choosing means associated therewith. Subsequent coarser, higher decades do not require additional choosing means, signals from the complementing terminals (such as C and $\overline{C}$ in FIGURE 1) of the next finer decade being used as choosing means.

Figure 3:
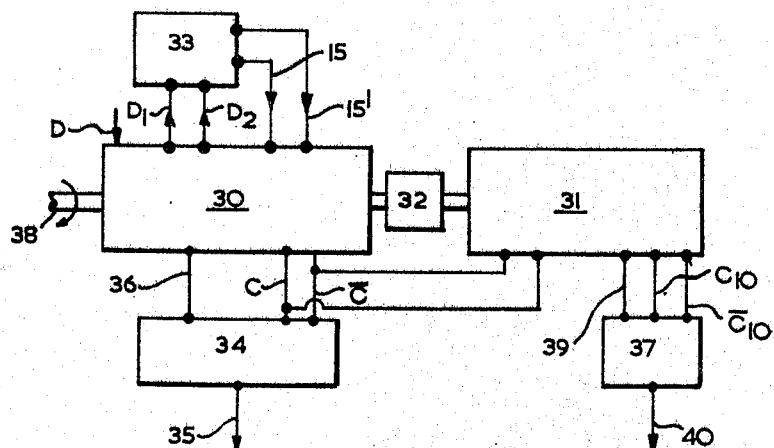
FIGURE 3 is a block diagram illustrating two decade scale digitizers, coupled together by means of a reduction gear train, and associated electronic circuits.

FIGURE 3 is a block diagram illustrating an exemplary multiple digitizer, comprising a fine digitizer 30, driven through a shaft 38 and driving a coarse digitizer 31 through a reduction gear train 32. The fine digitizer is provided with a bistable trigger circuit choosing means 33 (such as is illustrated in FIGURE 2), while the complementing output signals C and $\overline{C}$, from the second contact set of the fine digitizer, are connected to the coarse digitizer as choosing signals therefor. Amplifiers 34, connected to the terminals 0/9 to 4/5 of the fine digitizer, at 36, and to the terminals C and $\overline{C}$, comprise logic circuits for combining signals obtained from the complementary contact pairs with those from the complementing contacts, and provide separate readout lines, such as 35, for each digit of the fine digitizer.

Figure 4:
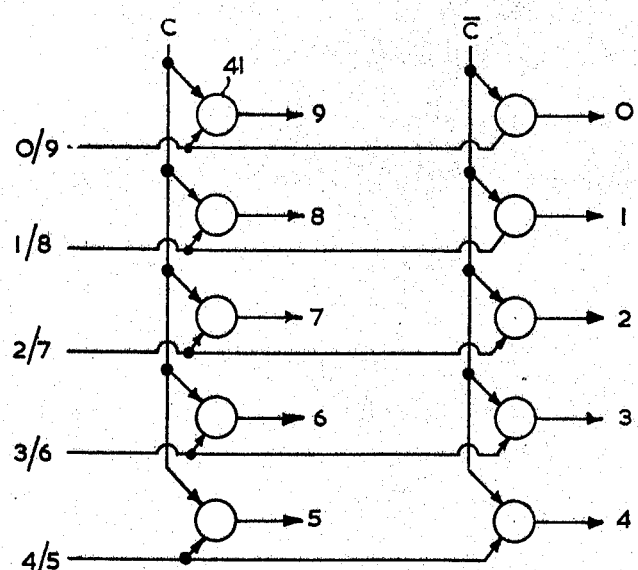
FIGURE 4 is ia diagram illustrating logic circuits comprised in amplifier 34 of FIGURE 3.

FIGURE 4 shows, diagrammatically, such amplifiers and logic circuits. In this figure, connecting lines 0/9, 1/8, 2/7, 3/6, 4/5, C and $\overline{C}$ are for respective connection to the corresponding terminals of the first and second contact sets, as shown in FIGURE 1; AND gates, such as 41, are respectively connected to these lines and can co-operate to allow a signal to reach one of the terminals 0 to 9, according to the reading to which the scale is set.

The complementing signals C and $\overline{C}$, are taken to terminals on the coarse digitizer 31, corresponding to connections 15 15′ in FIGURE 1, as choosing signals. Terminals in the coarse digitizer, corresponding to terminals 0/9 to 4/5 in FIGURE 1 but representing a scale of tens from 0 to 90, are connected at 39 to a second set of amplifiers 37, similar to 34; complementing signal $C_{10}$ and $\overline{C}_{10}$, from the second contact set of the coarse digitizer 31, are also connected to the amplifiers 37. The amplifiers 37 have separate readout lines, such as 40, corresponding to the tens digits.

It is frequently desired that the digitizer outputs be inhibited, except on interrogation; in such a case, it is preferable to apply inhibition gates to the outputs of the choosing means. Such an arrangement is shown in FIGURE 5, where 50 represents a digitizer, 51 is a choosing means (a bistable trigger circuit) and 52 and 53 are inhibiting gates between the outputs 15 and 15′, of the choosing means 51 and the choosing signal inputs to the digitizer. A drive signal is applied to the digitizer at D, and a read signal, 55, is applied to the gates 52 and 53, when it is required to de-inhibit the choosing signal, and thus the digitizer outputs, for readout.

When the time required to interrogate the signal lines, and to obtain a reading, is significant in relation to the time required for the scale reading to change by one division, ambiguity may be avoided by adapting the choosing device to act as a short term memory, by inhibiting the changeover. Thus, in FIGURE 1, so long as drive signals are applied to connection $D_1$ and $D_2$ of the choosing means 16, the digitizer output will change continuously, as long as the relative movement of the brushes and contacts is maintained; if, however, both drive signals are removed from the choosing means, or both choosing signals are removed from the connections, 15 and 15′, (by opening or shorting the connections thereto), immediately before interrogation, the output of the digitizer will remain unchanged for a theoretically maximum movement of one quarter of a division. After this, ambiguities may occur, unless the drive is restored. The necessary arresting time will depend on the speed on relative movement, at the time of readout, and on the resolution of the scale.

In the arrangement shown in FIGURE 5, the bistable trigger choosing means 51 can be used as a short term memory device. The trigger circuit must have been driven prior to readout by, for example, a drive pulse such as 54 in FIGURE 6; immediately before readout, the drive is removed and the trigger circuit remains set and is ready for readout. A read signal, 55, such as is shown in FIGURE 6, is then applied to de-inhibit the choosing signal and permit readout, but the duration $t$ of the read signal must not, in practice, exceed the time taken to traverse one eighth of a digit, unless the digitizer is held stationary, otherwise ambiguity may occur.

Each decade always provides two output signals (providing the second contact set has two contacts) to represent a digit (including zero); the absence of either one or both output signals indicates a fault.

The output of the digitizers so far described is a full decimal output; a binary coded decimal output may be obtained by applying the full decimal output to a diode logic matrix, in known manner. It is thus possible to provide both a full decimal and a binary coded decimal output, simultaneously.

It is preferred, in practice, that a digitizer comprise necessary isolating diodes; which may be connected for positive or negative signal outputs, as desired. Choosing means, inhibiting gates and other associated electronic circuits are preferably provided as separate items.

What is claimed is:

1. A reflected half-base digitizer having a set of elements comprising first support means; a first set of electrical contacts sequentially disposed on the first support means so as to provide a first contact path, the contacts corresponding to a scale of notation and being equal in number to the base of the scale, all the contacts being electrically connected together in complementary pairs symmetrically disposed about the center of the scale, except in the case of an odd based scale when the center contact has no complement and is electrically separated, whereby the complementary contacts are grouped together into lower and upper groups complementary to one another and wherein each of said pairs are electrically separated from the others of said pairs; a second set of not more than two contacts disposed on the first support means so as to provide a second contact path parallel to and in fixed relationship with the first contact path, one contact corresponding to one group of complementary contacts and the other contact, if present, to the other group; second support means, a first pair of brushes supported by the second support means, movement means for imparting relative movement between the first and second support means, whereby the first pair of brushes is capable of making sequential connection with the contacts of the first set, the brush pair having a leading brush mounted in advance of a lagging brush along the contact path, the brushes being so spaced that the lagging brush ceases to connect with a contact only if the leading brush is connected with the next adjacent contact; third support means; a second pair of leading and lagging brushes, capable of acting in a similar manner to the first pair of brushes and supported by the third support means in movable relationship with the second contact set, to provide a signal indicating to which group of complementary contacts one of the first pair of brushes is connected; all the brushes being mounted in fixed relationship one to another, and all the contacts having similar fixed relationship one to another.

2. A digitizer as claimed in claim 1 wherein the contacts of each contact set are mounted in line along the corresponding path.

3. A digitizer as claimed in claim 1 wherein the contacts of at least one contact set are staggered, perpendicular to the corresponding path, so as to be disposed along two or more parallel lines of contacts, each line being parallel to the length of the path; and wherein a pair of brush sets is associated with each staggered contact set, each brush set comprising a leading brush and a lagging brush associated with each line of contacts, all the leading brushes being electrically directly connected together and mounted on a single line perpendicular to the path, and all the lagging brushes being similarly connected and mounted.

4. A digitizer comprising a plurality of sets of elements each as claimed in claim 1 and being coupled together to define one of a corresponding plurality of scales of notation, all to one base and of sequentially increasing order.

5. A digitizer as claimed in claim 4 comprising mechanical means coupling together two adjacent sets of elements, relating to scales of corresponding adjacent order, the said mechanical means having a coupling ratio equal to the common scale base.

6. A digitizer as claimed in claim 5 comprising two sets of elements, of lower and higher order respectively, each set being disposed circularly about a drive shaft for imparting the said relative movement, the drive shaft of the lower order set being coupled to the drive shaft of the higher order set by means of a reduction gear train: the lower order set elements including means for providing a drive signal, said means comprising a third contact set having as many contacts as the first contact set, disposed in fixed relationship with the first and second sets along a contact path parallel to the first and second paths, each contact extending over a path length corresponding to half the path length occupied by a contact of the first contact set, the contacts being uniformly spaced so that a contact and an adjacent space correspond to one contact of the first contact set, all the contacts of the third contact set being electrically connected directly together; and two brushes arranged in leading and lagging relationship and mounted, in fixed relationship with the brushes relating to the first and second contact sets, to connect alternatively with each contact of the third set.

7. A digitizer as claimed in claim 6 including choosing means for the low order set of elements comprising a bistable trigger circuit; logic circuits for combining signals from the first and second contact sets of the lower order set of elements and having readout connections for providing signals coresponding to digits of the corresponding lower order scale; and similar logic circuits and readout connections for the higher order set of elements.

8. A digitizer as claimed in claim 1 including means associated with the scale for providing a drive signal for driving choosing means for selecting a desired one of each pair of brushes according to the true reading of the scale as determined by the relative positions of the scale and the first pair of brushes.

9. A digitizer as claimed in claim 8, wherein the said means for providing a drive signal comprises a third contact set having as many contacts as the first contact set, disposed in fixed relationship with the first and second sets along a contact path parallel to the first and second paths, each contact extending over a path length corresponding to half the path length occupied by a contact of the first contact set, the contacts being uniformly spaced so that a contact and an adjacent space correspond to one contact of the first contact set, all the contacts of the third contact set being electrically connected directly together; and two brushes arranged in leading and lagging relationship and mounted, in fixed relationship with the brushes relating to the first and second contact sets, to connect alternatively with each contact of the third set.

10. A digitizer as claimed in claim 1, including choosing means comprising a bistable trigger circuit.

11. A digitizer as claimed in claim 1, wherein the contacts and their interconnections are provided by printed circuit means on an insulating substrate.

References Cited

UNITED STATES PATENTS

| | | | |
|---|---|---|---|
| 3,111,660 | 11/1963 | Stupar | 340—347 |
| 3,122,733 | 2/1964 | Smith | 340—347 |
| 3,141,160 | 7/1964 | Hartke et al. | 340—347 |
| 3,156,911 | 11/1964 | Ziserman | 340—347 |

OTHER REFERENCES

A. K. Susskind, "Notes on Analog-Digital Conversion Techniques," 1957, pages 6–60 to 6–64.

MAYNARD R. WILBUR, Primary Examiner

CHARLES D. MILLER, Assistant Examiner